March 8, 1927.

L. A. PAINE 1,620,126

ELECTRIC MEASURING INSTRUMENT

Filed Feb. 20, 1922

Inventor.
Louis A. Paine
by H. J. S. Dennison
Atty.

Patented Mar. 8, 1927.

1,620,126

UNITED STATES PATENT OFFICE.

LOUIS A. PAINE, OF TORONTO, ONTARIO, CANADA, ASSIGNOR TO THE LINCOLN METER COMPANY LIMITED, OF TORONTO, ONTARIO, CANADA.

ELECTRIC MEASURING INSTRUMENT.

Application filed February 20, 1922. Serial No. 538,115.

The principal object of this invention is to provide an instrument which by means of a simple change of wiring connections may be utilized to measure either watts or volt amperes.

The principal feature of the invention consists in the novel arrangement of taps and wiring of the potential windings of a watt meter whereby an angular shift of the phase position of the flux, due to the line voltage, may be effected without changing the value of the flux so derived from that derived from the watt meter arrangement.

Figure 1:
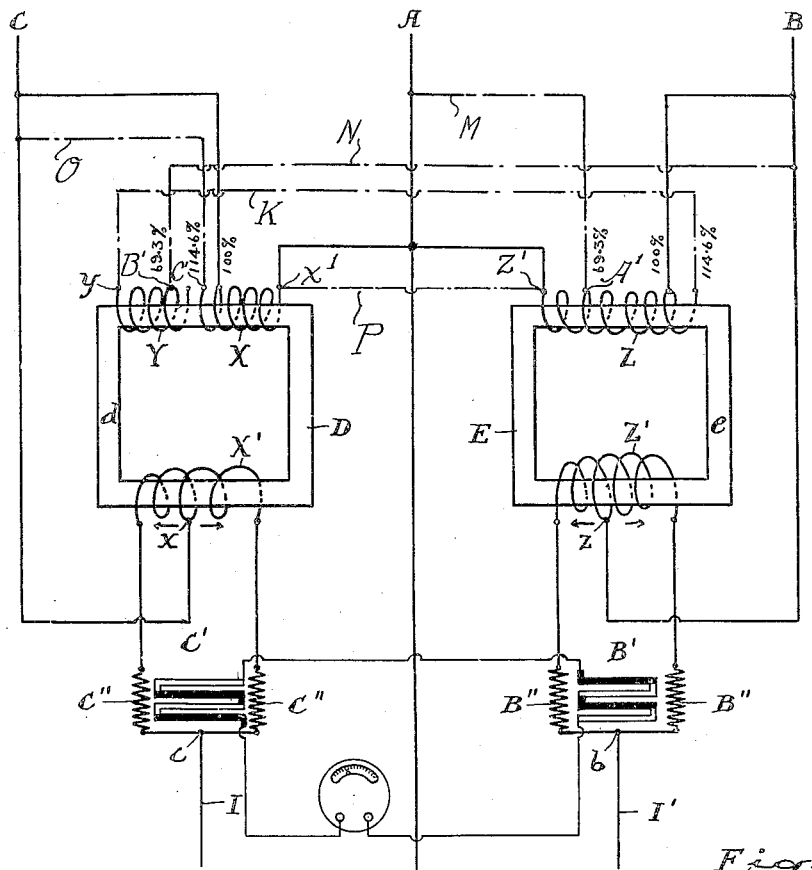

In the accompanying drawings, Figure 1 is a diagram of a watt meter illustrating the application of my invention thereto.

Figure 2:
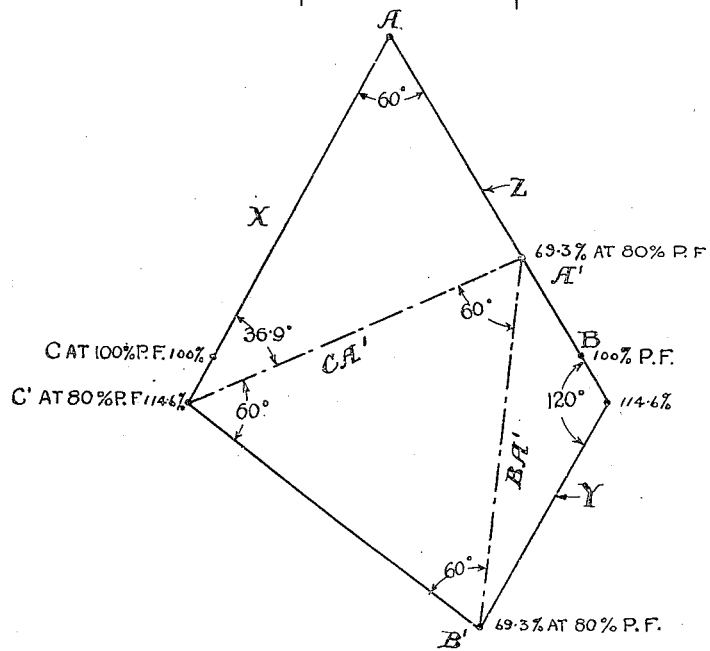

Figure 2 is a diagram illustrating a partial vector analysis of the wiring arrangement shown in Figure 1.

In the measurement of electrical values it is known that if an angular shift of the phase position of the flux due to the line voltage is in the same direction and is of the same value as the phase angle between the voltage and the current of an alternating current circuit having a power factor of other than unity, the result will be the measurement of volt amperes, when using a standard watt meter.

The present invention proposes an arrangement of wiring of the primary coils of the transformers by means of which the phase angle of the flux due to the line voltage may be shifted in accordance with the angular shift of the line current resulting from a power factor other than unity.

In the diagrammatic illustration Figure 1, the primary coils X and Z of the transformers D and E are shown connected to the three phase circuit A, B, C, by the full lines to effect the measurement of watts.

The watt meter herein illustrated is of the thermal type such as shown in United States Patent 1,300,283 of P. M. Lincoln. The present invention is not however restricted to the particular type of meter shown, as any other standard type of watt meter may be used. According to the arrangement of the "Lincoln" thermal type of meter the phase wires C and B are connected to the secondary coils X', Z', at the mid points $x$ and $z$ respectively and the line current is thus divided to flow equally through the heaters C" and B" again uniting at $c$ and $b$ to the wires I and I'. The flux produced in the transformers produces a voltage in the coils X', Z', which induces a current circulation in the heater circuits C', B' and creates an unbalancing of the thermal effect of the heaters, which differential quantity is equivalent to the watts applied.

The present invention introduces an additional element in the form of the coil Y in the primary of the transformer D. This coil is shown connected at the point $y$ by the lead K with the 114.6% tap point of the coil Z of transformer E and coil Z is connected at the 69.3% tap point by the lead M to A, while coil Y is connected at the 69.3% tap point by the lead N to B, therefore voltage BA is impressed on a portion of coil Y and a portion of coil Z. Likewise coil X is connected at its 114.6% tap point by the lead O to C and the lead P connects coil X at $x'$ to coil Z at $z'$ and voltage CA is thus impressed on part of X and part of Z through leads O, P, M. The arrangement of tap points described are the points which will be used when an 80% power factor is chosen as a mean power factor.

It will be readily understood from reference to Figure 2 that the shifting of the connections from the 100% power factor leads to the 80% power factor leads in the manner described will interpose the phases AC and AB into portions of both primary windings. The vector analysis shown in Figure 2 shows the connection, the three phase voltage shift being indicated as applied to points A', B', C'. Since the windings X and Y are on the same core, the voltages of these coils are necessarily in phase with each other. In Figure 2, the E. M. F. vectors X and Y are parallel and the winding Z is represented by the straight line AB, and further if the value of the taps is as indicated and a three phase voltage is applied to the taps at A', B', C', the secondaries of the transformers will have voltages that are in phase with their respective primaries, that is, in phase with coils X and Y in transformer D and with Z in transformer E. Therefore, the flux in the cores of these transformers has been shifted by 36.9 degrees which is the angle representing the shift between the voltage and current at 80% power factor.

It will be readily apparent that any desirable number of taps may be provided on the coils X, Y and Z to accommodate other degrees of angular shift, so that any desirable set of taps may be selected to effect the desired phase shift in accordance with the power factor of the load to be measured. The phase angle of the line current may shift 11.30 degrees in either direction from the angle of the tap without an error exceeding 2%, which is the amount of permissible error in ordinary commercial practice, therefore with the arrangement shown of an 80% P. F. tap the K. V. A. of a load may be measured which has a P. F. anywhere between 90% and 66% within commercial limits.

The invention is shown applied to a thermal type of meter but it will be readily understood that the flux due to the potential winding of any type of watt meter may be shifted in the same manner causing the instrument to register volt amperes at the power factor selected.

It will be noted that, although the phase position of the resultant fluxes in cores $d$ and $e$ are materially changed, the taps on coils XYZ may be so proportioned that there will be no change in the magnitude of the flux and consequently there will be no change in the magnitude of the local currents flowing in circuits C' and B', consequently the same proportional relationship is maintained between the local currents in circuits C' B' as when watts are being registered.

The method herein described relates to a three phase delta source of supply with a phase angle of 60 degrees between adjacent phase voltages but the principle enunciated is applicable to any polyphase system. For instance, in a two phase system the phases are 90 degrees apart and by combining voltages of the proper value and direction from each of these phases a resultant voltage of any desired phase and magnitude may be produced.

In the foregoing description the value of the tap points has been given on the basis that there is no resistance loss in primary or secondary coils of the transformers and no magnetic leakage between primary and secondary coils. In actual transformers or meter coils these theoretical conditions do not exist exactly. Resistance, reactance, condensance, magnetic leakage and perhaps other factors will enter to alter slightly the theoretical phase position of the resultant voltage. By altering slightly the tap points as given above, the resultant phase position may be made whatever desired in spite of the limitations imposed in design by resistance, reactance, condensance, magnetic leakage, etc. The value of this slight variation in tap points will depend on the material and design of the equipment used.

What I claim as my invention is:—

1. In an electric measuring instrument, the combination with a polyphase line circuit, of potential windings having taps arranged therein to be selectively connected with both phases of the line circuit to effect various degrees of angular phase shift, and means affected by the fluxes induced by the voltages impressed on said potential windings for indicating volt amperes.

2. In an electric measuring instrument, the combination with a polyphase line circuit, of a core having separate potential windings connected with the line circuit, a second core having windings connected with the first core so as to excite portions of windings of both cores in selective lengths, a volt ampere indicating instrument, and means responsive to the fluxes of said cores adapted to effect the indication of volt amperes.

3. In an electric measuring instrument, the combination with a polyphase line circuit, of transformers having taps in their potential windings arranged to be selectively connected with the line circuit to effect various degrees of angular phase shift, secondary windings on said transformers connected with the line circuit, local measuring circuits including said secondary windings, and means in said local circuits for indicating volt amperes.

4. In an electric measuring instrument, the combination with a polyphase circuit, of transformers having potential windings, the windings of one transformer being divided into separate elements having connections with the windings of the other transformer and connections to the line wires, said transformers having secondary windings connected with the line wires to divide the current flow, heaters arranged in the divided circuit adapted to be affected by the current flow in the divided circuit induced by the flux resultant from the impressed voltage of the potential coils, and means affected by said heaters for indicating volt amperes.

5. In an electric measuring instrument, the combination with a polyphase line circuit, of a pair of cores the first of which is provided with separate potential windings, one of said windings being connected to the winding of the second core and having tap points adapted to be connected with one of the phase wires of the line circuit, the other of said windings of the first core being connected with the winding of the second core and having tap points adapted to be connected with another phase line wire and the winding of the second core having tap points adapted to be connected to another phase wire, and means affected by the fluxes induced in said cores by the voltages impressed thereon for indicating volt amperes.

LOUIS A. PAINE.